United States Patent [19]

Achenbach

[11] Patent Number: 4,944,524
[45] Date of Patent: Jul. 31, 1990

[54] TELESCOPING STRUT SUSPENSION WITH FRICTION REDUCING TORSIONAL UNLOADING DEVICE

[75] Inventor: Kurt F. Achenbach, Milford, Mich.

[73] Assignee: Ford Motor Company, Dearborn, Mich.

[21] Appl. No.: 122,315

[22] Filed: Nov. 18, 1987

[51] Int. Cl.⁵ .............................................. B60G 17/00
[52] U.S. Cl. ................................... 280/701; 280/688; 280/695; 280/690; 267/221
[58] Field of Search ............... 280/688, 668, 673, 701, 280/696, 661, 660, 96.1, 690; 267/275, 279, 280, 259, 285, 221

[56] References Cited

U.S. PATENT DOCUMENTS

| Re. 31,384 | 3/1983 | LeJerman | 267/220 |
|---|---|---|---|
| 2,696,388 | 12/1954 | Kishline et al. | 280/688 |
| 2,992,015 | 6/1959 | Halford et al. | 280/124 |
| 4,341,397 | 7/1962 | Morimura et al. | 280/688 |
| 4,372,575 | 2/1983 | Hyma | 267/221 |
| 4,491,341 | 1/1985 | Maebayashi | 280/688 |
| 4,615,537 | 12/1984 | Damon | 280/668 |

FOREIGN PATENT DOCUMENTS 1405372  4/1959  Fed. Rep. of Germany .

Primary Examiner—Richard A. Bertsch
Attorney, Agent, or Firm—Jerome R. Drouillard; Roger L. May

[57] ABSTRACT

An independent suspension for a motor vehicle includes a wheel carrier with a spindle for rotatably mounting a road wheel, a telescoping strut having a lower end rigidly attached to the wheel carrier and an upper end attached to the chassis of the motor vehicle. A control arm is interposed between the wheel carrier and the chassis, and a torsional unloading device is interposed between the control arm and the telescoping strut such that the torsional unloading device will impose a force upon the telescoping strut tending to counteract an opposing bending moment imposed upon the strut by the wheel carrier.

16 Claims, 3 Drawing Sheets

TELESCOPING STRUT SUSPENSION WITH FRICTION REDUCING TORSIONAL UNLOADING DEVICE

BACKGROUND OF THE INVENTION

1. Field of the Invention

This invention relates generally to a torsional unloading device for reducing the operating friction within an automotive suspension strut.

2. Disclosure Information

Automotive suspension designs incorporating telescoping struts have taken a variety of forms. In the classical MacPherson design, the strut is positioned between a wheel carrier, to which it is rigidly mounted, and the vehicle's chassis, to which the telescoping strut is either pivotally or resiliently mounted. A spring device is commonly mounted concentrically about the strut. This spring device may comprise either a coil spring or an air spring or some other type of spring.

In the "modified" MacPherson design, a spring mechanism is mounted between a lower control arm attached to the wheel carrier, and the chassis. With both the classic and modified MacPherson designs, the strut is rigidly fastened at its lower end to the wheel carrier and pivotally or resiliently mounted to the chassis at its upper end. The rigid mounting between the strut and the wheel carrier causes the wheel carrier to impose a bending moment upon the strut which moment is counteracted within the strut by the strut's piston and bearing. This preloading is undesirable inasmuch as the static friction resulting therefrom increases the force necessary to initiate sliding of the piston within the strut and therefore correspondingly increases the shock loading transmitted to the chassis of the vehicle when an obstruction is encountered on a roadway surface. Attempts to minimize this undesirable static friction have resulted in configurations wherein the spring or other load bearing device is eccentrically mounted about the strut, or in other configurations in which the spring mounting pads are canted at an angle to the strut's center line. Although these solutions will normally cause a reduction of strut friction, an undesirable side effect may arise inasmuch as the packaging volume of the strut assembly may increase with either of the aforementioned structures.

U.S. Pat. No. 2,992,015 discloses a suspension arrangement in which friction is said to be reduced by rearranging the geometry of a strut type suspension system such that the point of intersection of the longitudinal axes of the strut and a control arm is relocated to a point above the center of ground contact of the tire and road wheel assembly. This system may not be workable in certain vehicles because the space limitations inherent in the particular design of the vehicle.

German Offenlegungsschrift No. 1,405,372 discloses a complicated system in which strut friction is minimized through the use of a series of rollers which act upon the strut rod. This system would be excessively costly and difficult to construct.

U.S. Pat. No. 4,615,537, which is assigned to the assignee of the present invention discloses yet another system for minimizing friction within the strut through the use of an upper mounting system which preloads the strut in the opposite direction from the loads imposed by the wheel carrier. This system may, however, produce undesirable loads in the vehicle's body or chassis.

It is an object of the present invention to provide a means for reducing the operational friction of a telescoping strut without causing an increase of the strut's package volume.

It is another object of the present invention to provide a means for reducing the operational friction of a telescoping strut which is economical to produce.

It is another object of the present invention to provide a means for reducing the operational friction of a telescoping strut which produces a reduction in friction throughout the full stroke of the strut from the full jounce to the full rebound position.

Other objects, features and advantages of the present invention will become apparent with the following description of this invention.

SUMMARY OF THE DISCLOSURE

According to the present invention, an independent suspension for a motor vehicle comprises a wheel carrier including a spindle for rotatably mounting road wheel, a telescoping strut having a lower end rigidly attached to the wheel carrier and an upper end attached to the chassis of the motor vehicle, a control arm interposed between the wheel carrier and the chassis, and a torsional unloading device interposed between the control arm and the telescoping strut such that the torsional unloading device will impose a force upon the telescoping strut tending to counteract an opposing bending moment imposed upon the strut by the wheel carrier. The control arm is pivoted to the wheel carrier and to the chassis and runs generally transversely of the chassis. The control arm may comprise either two parallel control arm segments running generally transversely of the vehicle or a single element running generally transversely of the vehicle. The suspension may also include a spring mounted about the telescoping strut which may comprise either a coiled steel spring or an air spring or another type of spring or load bearing unit.

In a first embodiment, a torsional unloading device according to the present invention comprises a torsion spring. This torsion spring may include two coiled segments with one end of each of the segments fastened to the control arm, with the other end of each of the segments being operatively connected with the telescoping strut. The ends of the segments which are operatively connected with the telescoping strut may be joined to each other. In the event that front and rear generally transverse control arms are used in a suspension according to the present invention, the torsion spring may comprise two coiled segments with each of the segments having a first end mounted between the control arms and a second end operatively connected with the telescoping strut such that the spring will impose a force upon a telescoping strut tending to counteract an opposing bending moment imposed upon the strut by the wheel carrier. The force imposed upon the telescoping strut by the torsional unloading device or torsion spring will act in a direction generally outboard of the vehicle.

In a second embodiment, a torsional unloading device according to the present invention comprises an elastomeric spring which comprises an annular elastomeric element bonded to ends mounted as before to the control arms and telescoping strut.

DETAILED DESCRIPTION OF THE DRAWINGS

Figure 1:
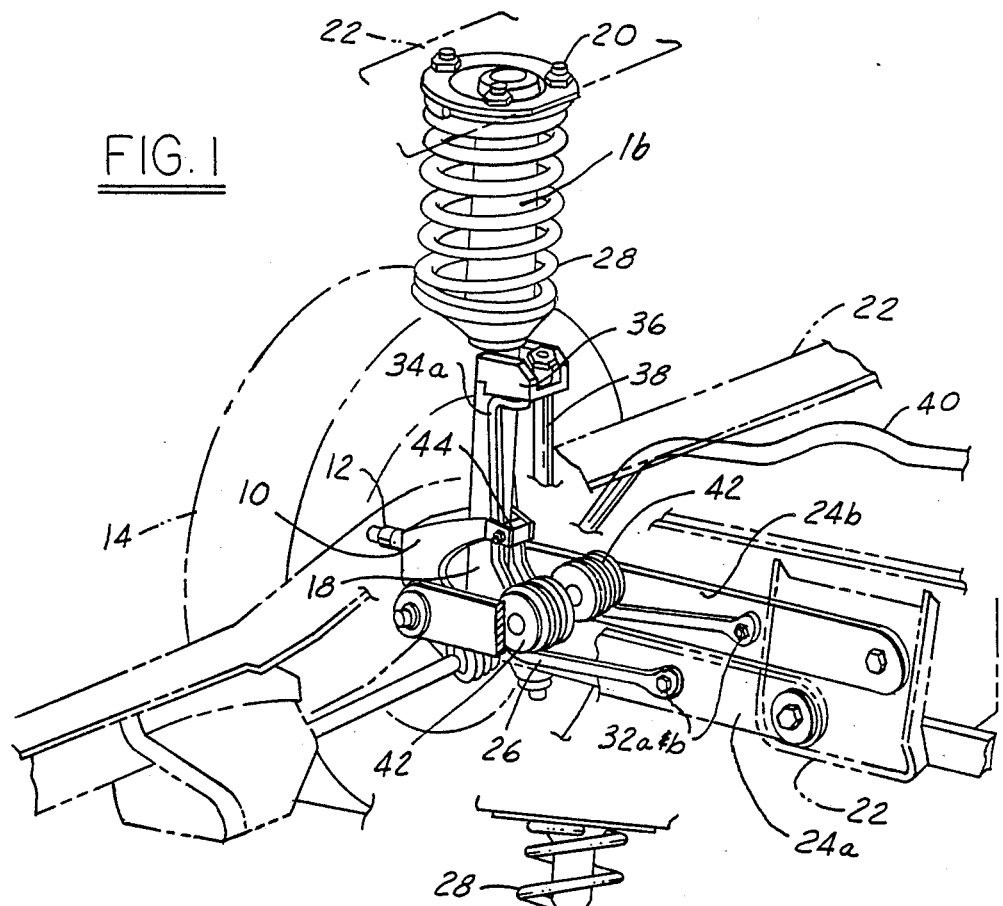
FIG. 1 is a perspective view, partially broken away, of a telescoping strut suspension with a friction reducing torsional unloading device according to the present invention.
Figure 2:
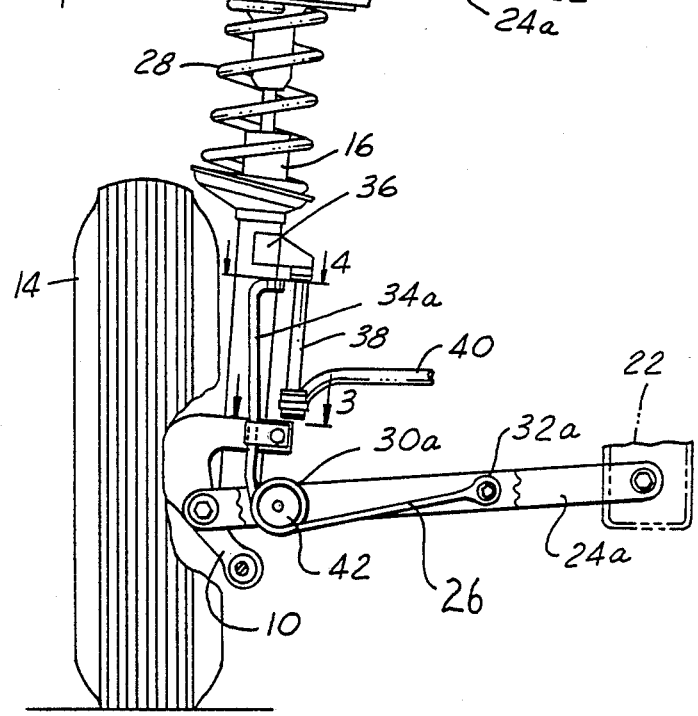
FIG. 2 is a frontal elevation, partially broken away, of the suspension shown in FIG. 1.
Figure 3:
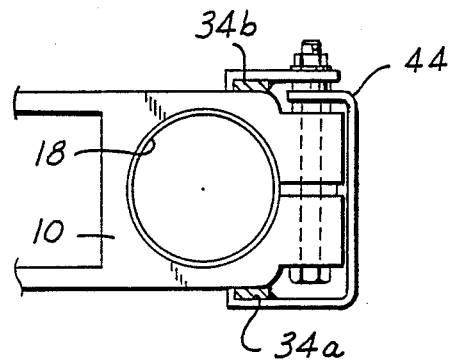
FIG. 3 is a sectional view of a portion of the suspension of FIG. 2, taken along the line 3—3 of FIG. 2.

As shown generally in FIGS. 1 and 2, an independent suspension for a motor vehicle includes wheel carrier 10 including a spindle 12 upon which a road wheel and tire assembly 14 is rotatably mounted. Telescoping strut 16 is rigidly mounted at its lower end 18 to wheel carrier 10. The upper end, 20 of telescoping strut 16 is resiliently mounted to chassis 22 of the motor vehicle.

Control arms, 24a and 24b run generally transversely of chassis 22 and are pivotally attached at their inboard ends to chassis 22 and at their outboard ends to wheel carrier 10. Those skilled in the art will appreciate in view of this disclosure that a torsional unloading device according to the present invention could be used in conjunction not only with the illustrated parallel arm arrangement, but also with other types of control arm systems including one piece arms or multi-piece arms comprising joined parallel segments.

Suspension spring 28 is mounted about the upper end of telescoping strut 16. Those skilled in the art will appreciate in view of this disclosure that not only a coiled steel suspension spring such as that illustrated in FIGS. 1 and 2, but also other types of load bearing devices such as an air suspension spring could be used in a suspension according to the present invention. It has been determined that the need for a torsional unloading device according to the present invention may be greater in the case of an air spring than would be the case with a steel spring because typical air springs do not readily lend themselves to other friction-reducing treatments.

A torsional unloading device, in the first case, torsion spring 26, is shown as being interposed between control arms 24a, 24b and telescoping strut 16 (FIGS. 1 and 2). As used herein, the term "torsional unloading device" refers to a means for reducing the operating friction of a telescoping strut by applying an outwardly directed force upon the strut in such a manner as to counteract an opposing bending moment imposed upon the strut by a wheel carrier mounted to the strut; thus, the term "torsional unloading device" does not apply merely to the illustrated embodiments.

Figure 5:
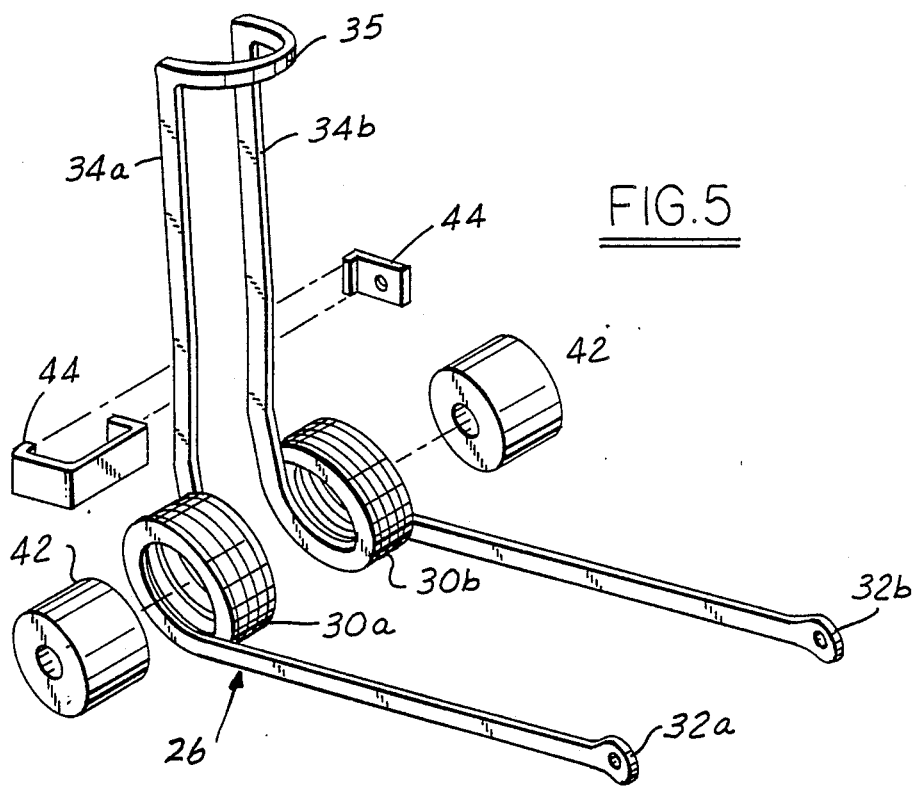
FIG. 5 is a perspective view of a first torsional unloading device according to the present invention.

Torsion spring 26, as shown with specificity in FIG. 5, includes coiled spring segments 30a and 30b having segment ends 32a and 32b and 34a and 34b. Each coiled spring segment comprises four coils. Those skilled in the art will appreciate in view of this disclosure that the use of four coils rather than, say, a single coil, will cause the coiled spring segments to have a lower spring rate; this in turn will cause the friction reducing effect of the illustrated torsional unloading device to be relatively predictable and constant throughout the range of suspension travel from full jounce to full rebound. Although a torsional unloading device according to the present invention could be fashioned in other configurations, and of other materials such as various elastomers, such other configurations and materials might not produce the predictable, relatively constant results expected of the illustrated embodiment.

Figure 4:
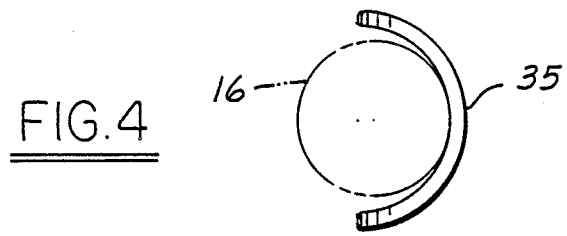
FIG. 4 is a sectional view of a portion of the suspension of FIG. 2, taken along the line 4—4 of FIG. 2.

Segment ends 32a and 32b include eyelets through which fasteners are passed so as to attach segment ends 32a and 32b to control arm segments 24a and 24b. Torsion spring segment ends 34a and 34b are joined into semicircular tang 35, which bears against telescoping strut 16 at an inboard location (FIG. 4). In a preferred embodiment the spring is formed from trapezoidal wire having a Society of Automotive Engineers designation SAE 1065. The spring material is preferably oil tempered to achieve a Rockwell hardness of 44.50 on the "c" scale. A trapezoidal cross section may preferably be chosen for the spring wire because the coiling process will cause the trapezoidal shape to be transformed into a square cross section in the area of coils 30a and 30b. Accordingly, the spring is coiled so that the trapezoid is pointed upwardly in the area of segment ends 32a and 32b.

Those skilled in the art will appreciate in view of this disclosure that a variety of fasteners and other mechanisms could be employed for the purpose of attaching the segment ends of the torsion spring to the control arms as well as to the telescoping strut. It has been determined, however, that for a suspension of the type illustrated in FIGS. 1 and 2, whether equipped with a coil spring as shown or with an air spring, that tang 35 may be satisfactorily located within the pocket formed by the intersection of strut 16 with stabilizer bar attaching link bracket 36. The usual function of bracket 36 involves the connection of stabilizer bar attaching link 38 to strut 16. The stabilizer bar attaching link runs between bracket 36 and stabilizer bar 40.

Spring segment ends 34a and 34b are located by mounting bracket 44, which also serves to prevent coiled spring segments 30a and 30b from contacting control arms 24a and 24b. Such contact could produce undesirable noise. In a similar vein, elastomeric isolators 42, which fill the spaces created by coiled spring segments 30a and 30b, serve to damp noise which would otherwise emanate from segments 30a and 30b.

Figure 6:
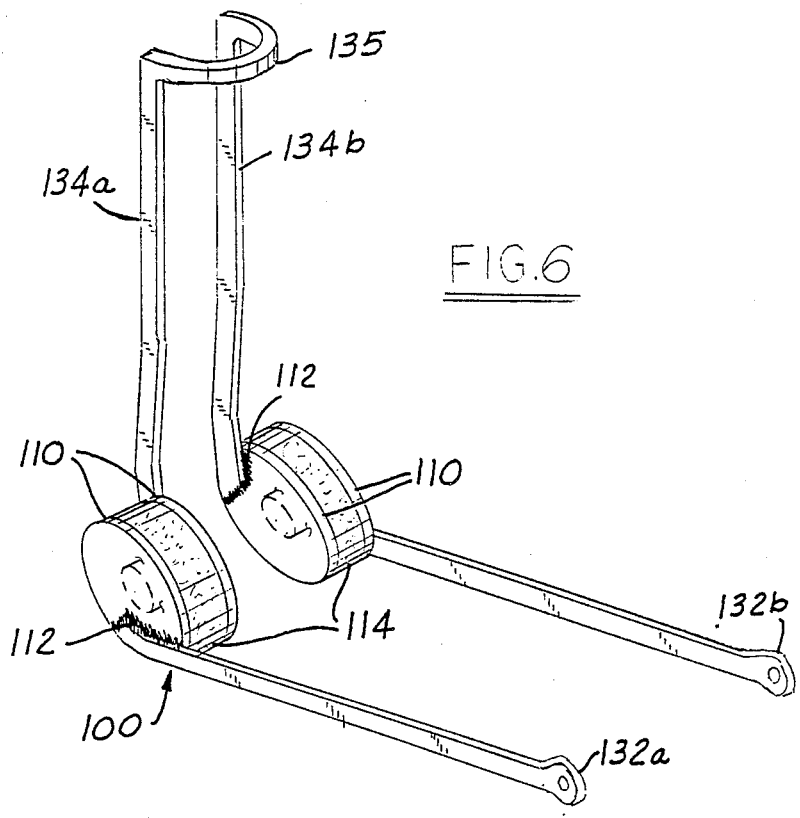
FIG. 6 is a perspective view of a second torsional unloading device according to the present invention.

A second embodiment of the present invention is depicted in FIG. 6. A principal difference between the devices of FIGS. 5 and 6 resides in the substitution of annular elastomeric elements 114, for coiled spring segments 30a and 30b. Each elastomeric element is bonded to a circular plate, 110. This bonding could be performed as part of a molding process for forming elastomeric elements 114. Each circular plate 110 is attached to an arm segment, in this case by welding. Those skilled in the art will appreciate in view of this disclosure that other configurations for the elastomeric elements and plates 110 could be employed. For example, the elastomeric elements could be formed as solid cylinders rather than as the illustrated annuli. It should be further appreciated that elastomeric material could be allowed to completely cover all surfaces of plates 110 during the molding process. This would allow the elastomeric material to further damp vibration occurring in the torsional unloading device. The function of the torsional unloading devices in each of FIGS. 5 and 6 is explained below.

A suspension including a torsional unloading device according to the present invention operates as follows. Whether the suspension is at rest in its static position—i.e., when it is not moving in either the jounce or rebound directions—or whether the suspension is moving, the torsional unloading device exerts an outwardly directed force against telescoping strut 16. This force results from a winding up of the active element of the torsional unloading device—whether the element comprises a metallic spring or an elastomeric body. As noted above, the torsional unloading device will preferably be installed so that the active element is exerting a force even when the suspension is at its normal ride height. It has been found that torsional unloading devices such as those described herein will produce satisfactory results with a mid-size luxury vehicle equipped with air suspension spring struts in the event that the torsional unloading device is configured to produce approximately 250 lbs. of outward force when the vehicle is at normal ride height and statically loaded. This outwardly directed force provided by the torsional unloading device counteracts the opposing bending moment imposed by wheel carrier 10 upon telescoping strut 16. As a result, the sliding friction of the piston against its cylinder wall and of the piston rod against its rod guide will be minimized. This friction reduction will in turn cause the amount of force necessary to initiate movement of the piston within the strut to be reduced, with a concomitant benefit to the ride of the vehicle.

Although the present invention has been fully described in connection with the preferred embodiments thereof with reference to the accompanying drawings, it is to be noted that various changes and modifications will be apparent to those skilled in the art. Such changes and modifications are to be understood as included within the true scope of the present invention.

I claim:

1. An independent suspension for a motor vehicle comprising:
   a wheel carrier including a spindle for rotatably mounting a road wheel;
   a telescoping strut having a lower end rigidly attached to said wheel carrier and an upper end attached to the chassis of said motor vehicle;
   a control arm interposed between said wheel carrier and said chassis; and
   a torsional unloading device comprising a torsion spring interposed between said control arm and said telescoping strut such that said torsional unloading device will impose a force upon said telescoping strut tending to counteract an opposing bending moment imposed upon said strut by said wheel carrier.

2. A suspension according to claim 1 wherein said control arm is pivoted to said wheel carrier and to said chassis.

3. A suspension according to claim 2 wherein said control arm runs generally transversely of said chassis.

4. A suspension according to claim 1 wherein said control arm comprises two parallel segments running generally transversely of said vehicle.

5. A suspension according to claim 1 further comprising a suspension spring mounted about said telescoping strut.

6. A suspension according to claim 1 wherein said force imposed upon said telescoping strut by said torsional unloading device acts in a direction generally outboard of said vehicle.

7. A suspension according to claim 1 wherein said torsion spring comprises two coiled segments with one end of each of said segments being fastened to said control arm and the other end of each of said segments being operatively connected with said telescoping strut.

8. A suspension according to claim 7 wherein said torsion spring is fastened to said control arm at a position which is inboard of said wheel carrier.

9. A suspension according to claim 7 wherein the ends of said segments which are operatively connected with said telescoping strut are joined to each other.

10. An independent suspension for a motor vehicle comprising:
    a wheel carrier including a spindle for rotatably mounting a road wheel;
    a telescoping strut having a lower end rigidly attached to said wheel carrier and an upper end attached to the chassis of said motor vehicle;
    a control arm interposed between said wheel carrier and said chassis; and
    a torsional unloading device comprising an elastomeric element, interposed between said control arm and said telescoping strut such that said torsional unloading device will impose a force upon said telescoping strut tending to counteract an opposing bending moment imposed upon said strut by said wheel carrier.

11. An independent suspension for a motor vehicle comprising:
    a wheel carrier including a spindle for rotatably mounting a road wheel;
    a telescoping strut having a lower end rigidly attached to said wheel carrier and an upper end attached to the chassis of said motor vehicle;
    front and rear generally transverse control arms pivotally attached to said wheel carrier and said chassis; and
    a torsion spring comprising two coiled segments with each of said segments having a first end mounted between said control arms and a second end operatively connected with said telescoping strut such that said spring will impose a force upon said telescoping strut tending to counteract an opposing bending moment imposed upon said strut by said wheel carrier.

12. A suspension according to claim 11 further comprising a suspension spring mounted about said telescoping strut.

13. A suspension according to claim 11 wherein said force imposed upon said telescoping strut by said torsion spring acts in a direction generally outboard of said vehicle.

14. An independent suspension for a motor vehicle comprising:
    a wheel carrier including a spindle for rotatably mounting a road wheel;
    a telescoping strut having a lower end rigidlY attached to said wheel carrier and an upper end attached to the chassis of said motor vehicle;
    front and rear generally transverse control arms pivotally attached to said wheel carrier and said chassis; and
    an elastomeric torsion spring comprising two elastomeric elements with each of said elements bonded to a first end mounted between said control arms and a second end operatively connected with said telescoping strut such that said spring will impose a force upon said telescoping strut tending to counteract an opposing bending moment imposed upon said strut by said wheel carrier.

15. An independent suspension according to claim 14 wherein each of said elastomeric elements comprises an elastomeric annulus.

16. An independent suspension according to claim 14 wherein each of said elastomeric elements comprises an elastomeric cylinder.

* * * * *